United States Patent [19]

Saxton

[11] Patent Number: 5,032,632
[45] Date of Patent: Jul. 16, 1991

[54] OXIDATION-RESISTANT ETHYLENE VINYL ALCOHOL POLYMER COMPOSITIONS

[75] Inventor: Ronald L. Saxton, West Grove, Pa.

[73] Assignee: E. I. du Pont de Nemours and Company, Wilmington, Del.

[21] Appl. No.: 523,566

[22] Filed: May 15, 1990

[51] Int. Cl.$^5$ .................... C08K 5/5333; C08K 5/09
[52] U.S. Cl. ................................. 524/139; 524/194; 524/219; 524/291; 524/330; 524/342; 524/399; 524/400; 524/503
[58] Field of Search ............... 524/291, 342, 194, 400, 524/399, 503, 219, 330, 139; 525/60

[56] References Cited

U.S. PATENT DOCUMENTS

| | | | |
|---|---|---|---|
| 3,772,245 | 11/1973 | Dexter | 524/194 |
| 3,926,876 | 12/1975 | Fukushima et al. | 524/341 |
| 4,347,337 | 8/1982 | Knott | 525/60 |
| 4,367,305 | 1/1983 | Satoh et al. | 525/60 |
| 4,613,644 | 9/1986 | Moritani et al. | 524/430 |
| 4,704,423 | 11/1987 | Iwanami et al. | 524/503 |
| 4,753,760 | 6/1988 | Kawaguchi et al. | |
| 4,826,735 | 5/1989 | Ueki et al. | 524/503 |

FOREIGN PATENT DOCUMENTS

| | | |
|---|---|---|
| 0308703 | 3/1989 | European Pat. Off. . |
| 62-143954 | of 0000 | Japan . |
| 63-286459 | of 0000 | Japan . |
| 54-87783 | 7/1979 | Japan . |
| 1-69653 | 3/1989 | Japan . |
| 86/07151 | 9/1986 | South Africa . |

Primary Examiner—Veronica P. Hoke

[57] ABSTRACT

A composition of a copolymer of ethylene and vinyl alcohol, 0.01 to 0.5 weight percent of a monovalent or divalent metal salt of an aliphatic carboxylic acid having 3 to 9 carbon atoms and 0.05 to 0.5 weight percent of a hindered phenolic antioxidant exhibits improved stability toward oxidative gel formation at elevated temperatures.

19 Claims, No Drawings

OXIDATION-RESISTANT ETHYLENE VINYL ALCOHOL POLYMER COMPOSITIONS

BACKGROUND OF THE INVENTION

This invention relates to ethylene vinyl alcohol copolymer compositions which exhibit improved resistance to oxidative and thermal degradation and gelation.

Ethylene vinyl alcohol copolymer (EVOH) as formed may not have adequate thermal or oxidative stability for certain applications. It is often observed that the melt viscosity of EVOH resins increases with time, and the rate of increase increases with temperature. It is presumed that this effect results from the increasing strength of residual acid from the washing process, at higher temperatures. It is known that acids catalyze crosslinking reactions in EVOH, strong mineral acids such as HCl being especially potent. It is also possible that spontaneous dehydroxylation occurs at elevated temperatures, leading to interchain linkages. The resulting increase in viscosity can eventually cause gelation or solidification of the molten polymer. Such behavior can result in metal surfaces of processing equipment becoming coated with a varnish-like layer of intractable, discolored, degraded polymer. Buildup of this layer can cause a gradual rise in torque required for extruder screws and, when exfoliated, the sporadic appearance of gel particles in the extruded product. Furthermore, when molten EVOH is exposed to oxygen, e.g. through air incursion at feed and vent ports of extruders, the polymer rapidly darkens and crosslinks to yellow-brown gel. This gelation can occur in only 10-20 minutes. As a result of these problems, comparatively low melt processing temperatures (210°-230° C.) are normally recommended for processing EVOH polymers, and even then such problems can persist.

There has been much activity to find a way to increase the thermal and oxidative stability of EVOH. South African patent application 86/07151 (British appln. 2,182,334) discloses a vessel comprising a composition of EVOH and a propylene resin or a thermoplastic resin having in the main or side chain a carbonyl group. The resin mixture is stabilized against gelation, discoloration, and reduction of gas barrier properties by incorporation of a hydroxide or higher fatty acid salt of an alkaline earth metal and an antioxidant. The higher fatty acid salts include barium, calcium, or especially magnesium salts of saturated or unsaturated fatty acids having 10-26 carbon atoms. There is no disclosure of salts of fatty acids having fewer than 10 carbon atoms. Sterically hindered phenols are preferred antioxidants.

U.S. Pat. No. 4,704,423 discloses molded articles comprising a mixture of an olefin resin which includes residual chlorine due to a Ziegler type catalyst, a hydrolyzed ethylene-vinyl acetate copolymer, and a hydrotalcite compound, exhibiting reduced gel formation during processing. The composition optionally contains a metal salt of a higher fatty acid, especially stearic acid, and usual additives such as a stabilizer. The higher fatty acids are those of 12 or more carbon atoms; there is no disclosure of salts of lower molecular weight acids nor of combainations of such salts with antioxidants.

Japanese patent application 64-69653 (and its cognate 01-069653) and European application 0 308 703 disclose an EVOH composition containing 0.005-0.05 wt % of a salt of a group II metal, 0.002-0.2 wt. % of an acidic substance with a pKa value of 3.5 or above and a boiling point of 180° C. or above, 0.01-0.2 wt % of an acidic substance with a pKa value of 3.5 or above and a boiling point of 120° C. or below and 0.01-1 wt. % of a hindered phenol containing ester. The high boiling acid can be caprylic acid; the low boiling acid can be formic, acetoacetic, or preferably acetic acid. The salts include beryllium, magnesium, calcium, zinc, and barium—carbonates, sulfates, phosphates, chlorides, or preferably acetates. All the examples appear to include acetic acid or salts thereof as a component, and there is no teaching that metal salts of the higher boiling acids be used. The composition yields a molded product which is unaccompanied by gelation.

Japanese application 62-143954 discloses saponified ethylene vinyl acetate copolymer treated with an acid, preferably acetic acid/$H_3PO_4$, and a calcium or magnesium salt of a polybasic acid, preferably phosphoric acid. The treated copolymer has high heat stability.

Japanese application 54-87783 discloses a method to improve the adhesive property between a layer of polyolefin (grafted with acid or anhydride) laminated to and a layer of ethylene-vinyl alcohol copolymer, a polyamide resin, a polyester resin, or a hydrocarbon synthetic elastomer. A phenol antioxidant and a higher fatty acid salt having 7-23 carbon atoms, particularly calcium laurate, palmitate, or stearate are added to the polyolefin layer or to both layers. The examples show the salts present in polyolefin layer.

Japanese application 63-286459 discloses a composition of an ethylene vinyl alcohol copolymer with an amide having a hindered phenol group. An exemplified composition took 75 minutes until the rate of torque rise amounted to 1.5 kg-cm/min when kneaded at 220° and 90 r.p.m. under air, compared with 6 minutes for a composition containing instead BHT. There is no disclosure of the use of salts of certain aliphatic carboxylic acids.

U.S. Pat. No. 3,926,876 discloses a flame-resistant resinous molding of ethylene-vinyl alcohol copolymer, 5 to 50 parts of a haloorganocompound, 0.2 to 10 parts of a metallic soap, and 0 to 30 parts of antimony trioxide. The metallic soaps are metal salts of fatty acid other than alkali metal salts, such as certain stearates, laurates, and ricinoleates. There is no disclosure of the addition of hindered phenolic antioxidants nor salt of lower acids.

U.S. Pat. No. 4,753,760 discloses a method of preparing saponified product pellets of ethylene-vinyl acetate copolymer extruding a solution of the copolymer in methanol or water-methanol mixture containing a lubricant into strands which are cut and pelletized. The lubricant can be e.g. ethylene bis-stearic amide or a fatty acid metallic salt such as potassium stearate. There is no disclosure of addition of salts of aliphatic carboxylic acids having 3-9 carbon atoms nor of antioxidants.

SUMMARY OF THE INVENTION

The present invention provides a composition exhibiting improved stability toward oxidative gel formation at elevated temperatures as well as near zero or negative increase in melt viscosity with time. The composition consists essentially of:
  (a) a copolymer of ethylene and about 90 to about 50 percent by weight of vinyl alcohol moieties, having a degree of saponification of at least about 95%;
  (b) about 0.01 to about 0.5 weight percent of a monovalent or divalent metal salt of an aliphatic carboxylic acid having 3 to 9 carbon atoms; and (c) about 0.05 to about 0.5 weight percent of a hindered phenolic antioxidant.

In a preferred embodiment the composition further comprises about 0.05 to about 0.5 weight percent of a divalent metal salt of stearic acid.

The present invention further comprises a process for improving the stability of an ethylene-vinyl alcohol resin towards oxidative gel formation, comprising the steps of:
- (a) providing a copolymer of ethylene and about 90 to about 10 weight percent copolymerized vinyl alcohol moieties, saponified to at least about 95%; and
- (b) melt compounding said copolymer with:
  - (i) about 0.01 to about 0.5 weight percent of a monovalent or divalent metal salt of an aliphatic carboxylic acid having 3 to 12 carbon atoms; and
  - (ii) about 0.05 to about 0.5 weight percent of a hindered phenolic antioxidant.

DETAILED DESCRIPTION OF THE INVENTION

The present invention includes an ethylene vinyl alcohol composition with a specifically selected stabilizer composition. The EVOH resins useful in this invention include resins having a copolymerized vinyl alcohol content of about 50 to about 90 weight percent, especially about 60 to about 80 weight percent. Copolymers of greater than about 85 to 90 percent vinyl alcohol moieties tend to be difficult to extrude while those having less than about 40 or 50 percent vinyl alcohol have reduced oxygen barrier performance, which detracts from usefulness of the polymer in many important applications. These polymers will have a saponification degree of at least about 90%, preferably at least about 95%, and most preferably at least about 98%, i.e., substantially complete saponification. A degree of saponification of less than about 90% results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between about 160° and 190° C.

Ethylene vinyl alcohol copolymer (EVOH) is typically manufactured from a precursor polymer, such as ethylene vinyl acetate, which is put into methanolic solution and caused to undergo a transesterification reaction by adding a basic catalyst such as sodium methoxide or sodium hydroxide. When the desired high degree of conversion to ethylene vinyl alcohol polymer has been achieved, the catalyst is neutralized by addition of a slight excess of an acid such as acetic acid, and the EVOH is precipitated by mixing or contacting the reaction solution with water or a weak alcohol-water solution. The resulting porous particles are filtered from the slurry and purified of alcohol and salt by-products (e.g. sodium acetate) by washing with water acidified to a pH of 4–5 with certain weak aqueous acids in a final washing step before drying.

Variations on this synthesis route are well known to those of skill in the art; certain of these variations are set forth more fully in the Examples which follow.

The stabilizer composition useful in the present invention comprises at least two components: a selected metal salt of a carboxylic acid, and a hindered phenolic antioxidant. The hindered phenolic antioxidant can be one or more of a class of antioxidants characterized by a phenol group with sterically bulky substituents located ortho to the OH functionality. Such antioxidants are well-known and are sold under a variety of trade names. Suitable antioxidants include 4,4'-thio-bis(6-t-butyl-m-cresol) 1,3,5-trimethyl-2,4,6-tris(3,5-t-butyl-4-hydroxybenzyl)benzene tetrakis(methylene(3,5-di-t-butyl-4-hydroxyhydrocinnamate)methane, octadecyl-3,5-di-t-butyl-4-hydroxyhydrocinnamate, N,N'-hexamethylene-bis(3,5-di-t-butyl-4-hydroxyhydrocinnamide), N,N'-trimethylene-bis(3,5-di-t-butyl-4-hydroxyhydrocinnamamide), and hexamethylene-bis(6-t-butyl-m-cresol).

The amount of hindered phenolic antioxidant should be about 0.05 to about 0.5, preferably about 0.10 to about 0.3, weight percent, based on the total amount of polymer present.

The other component of the stabilizer composition is the salt of a monovalent or divalent metal and an aliphatic carboxylic acid having 3 to 9 carbon atoms. The metal component of the salt is not particularly limited; suitable metals include calcium, zinc, magnesium, lead, manganese, tin, sodium, and potassium. Calcium, magnesium, and zinc are preferred, and calcium is particularly preferred. Aliphatic carboxylic acids having 3 to 9 carbon atoms are preferably saturated, unsubstituted monocarboxylic acids and include propionic acid, n-butyric acid, isobutyric acid, n-pentanoic acid, n-hexanoic acid, n-heptanoic acid, n-octanoic acid, 2-ethylhexanoic acid, n-nonanoic acid, and isomers thereof. The salts of acetic acid are not useful in the present invention, and the salts of acids having greater than 9 carbon atoms are progressively less useful. In addition to salts of a single acid, mixtures of a variety of such acids may be commercially available, and would be quite suitable. The preferred acids are those of 3 to 8 or especially 4 to 8 carbon atoms. In terms of cost and effectiveness, calcium octanoate is a specially preferred salt. Mixtures of salts of acids of different molecular weights can be employed as desired to achieve the desired stabilizing effect.

The amount of the above described salt should be about 0.01 to about 0.5 weight percent of the polymeric component of the composition. The preferred amount will depend to some extent on the identity and molecular weight of the acid component of the salt. Expressed in different terms, the composition should contain about 0.5 to about 15 micromoles (i.e., microgram moles) of the salt per gram, preferably about 1 to about 7 micromoles per gram, and most preferably about 2 to about 4 micromoles per gram. Below these ranges the effectiveness of the invention is not so clearly presented; above these ranges no additional benefit is seen; indeed the viscosity reducing action of the salt may become severe at higher concentrations.

In one embodiment of the present invention, a salt of a higher fatty acid is also present. The higher fatty acid can be any of those having about 14 to about 22 carbon atoms, and the neutralizing metal ion can be any of those listed above. The amount of such salt is preferably 0.05 to 0.5 weight percent. In particular, it has been found that addition of a small amount of a stearate, in particular calcium stearate can give desirable results.

In addition to the above components, additional additives, fillers, and the like can be added for their ordinary functions, so long as they do not interfere with the functioning of the present invention. Such additives can include glass fiber or microspheres, talc, clay, mica, lubricants (e.g. ethylene bis-stearamide, polyethylene waxes, ionomer waxes) and pigments.

Addition of the stabilizer package of the present invention results in improved resistance to viscosity increase while in the melt and hence to eventual formation of gelled adhesions and gel particles. Both the metal salt and the hindered phenolic antioxidant appear to be necessary to fully obtain this improvement. Furthermore, it appears that the carbon chain length of the carboxylic acid of the metal salt is important; salts of acetic acid, having two carbon atoms are not particularly effective. It is believed that likewise the salts of formic acid will not be useful; they are thus not a part of the present invention. Preferably the compositions will be substantially free of such salts, i.e., they will be present, if at all, in amounts less than about 0.015 weight percent so as not to interfere with the actions of the preferred salts. The improvement is most pronounced in salts having 4 to 8 carbon atom chains and diminishes greatly for chain lengths greater than about 10. In the preferred compositions the oxidative gel formation at elevated temperatures is less than about 3 $g/m^2$, and in particularly preferred compositions, less than about 0.7 $g/m^2$ (measured as described in the Examples). And whereas the melt viscosity of unstabilized EVOH normally increases dramatically with time at 250° C., in preferred cases the composition of the present invention exhibits a viscosity after 34 minutes which is only about 0.4 to 1.4 times that at 10 minutes; in more preferred cases this viscosity ratio is about 0.6 to 1.1; and in the most preferred cases the ratio is slightly less than 1.0.

Compositions of the present invention are readily prepared by melt compounding the copolymer with the additive package in an extruder or other suitable equipment. Preferably the additive powders should be added to and mixed with the EVOH particles on at least a gross scale by dry blending before the EVOH is melted, in order to minimize all polymer degradation. Alternatively, it may be feasible to provide the additives by means of a master batch, whereby the aliphatic carboxylic acid metal salt and hindered phenolic antioxidant are precompounded in a carrier resin which is compatible with the final product. Pellets or a melt of this master batch can be added to the EVOH composition and the two components mixed together in the molten state.

The compositions of the present invention are useful in providing oxygen and/or flavor barrier layers in coextruded plastic structures, e.g., multilayer sheets and thermoformed containers therefrom, multilayer films, pipes, tubes, and blow-molded articles, and in multilayer structures formed by injection molding, colamination, or by extrusion coating.

EXAMPLES 1-31

The effects of varying concentrations of lower alkyl calcium alkanoates in the present invention were investigated. For each of these Examples and Comparative Examples (indicated by the letter "C"), a sample of ethylene vinyl alcohol was used which had been prepared from a precursor ethylene vinyl acetate copolymer by base-catalyzed alcoholysis. This resin had an ethylene content of 30 mole % (21 weight %), a degree of hydrolysis of greater than 99%, and a melt flow index of 8.6 dg/min (as measured in a melt indexer apparatus at 210° C. with a 2160 g weight). The moisture content of the resin was 1.5%, and it contained 11 ppm sodium. Portions of this resin were compounded with additives as listed in Table I. In this and succeeding tables, the following abbreviations are used:

AlOl3 = aluminum oleate tribasic
AlSt1 = aluminum stearate monobasic
AlSt2 = aluminum stearate dibasic
CaSte = calcium stearate
CaAce = calcium acetate monohydrate
CaPro = calcium propionate
CaBut = calcium n-butyrate trihydrate
CaHex = calcium n-hexanoate
CaHep = calcium n-heptanoate
CaOct = calcium n-octanoate (caprylate)
Ca2EH = calcium 2-ethylhexanoate
CaNon = calcium n-nonanoate (pelargonate)
CaDod = calcium dodecanoate (laurate).
CaBen = calcium benzoate
CaAsc = calcium ascorbate
KPal = potassium palmitate
KSte = potassium stearate
K2EH = potassium 2-ethylhexanoate
KiVal = potassium isovalerate (2-methylbutyrate)
MgAce = magnesium acetate tetrahydrate
MgBut = magnesium butyrate
MgCar = magnesium carbonate $MgCO_3 \cdot Mg(OH)_2 \cdot 3H_2O$
MgSte = magnesium stearate
MnBut = manganese butyrate
MnGlp = manganese glycerophosphate
MnOct = manganese octanoate
MnSte = manganese stearate
MnCit = manganese citrate
MnGlu = manganese gluconate
NaOct = sodium octanoate (caprylate)
NaSte = sodium stearate
NaHep = sodium heptanoate
PbSte = lead stearate
SnOct = tin octanoate
SnSte = tin stearate
SnOle = tin oleate
ZnAce = zinc acetate dihydrate
ZnPen = zinc pentanoate (valerate) dihydrate
ZnOct = zinc octanoate (caprylate)
ZnSte = zinc stearate
Etx330 = "Ethanox" 330 from Ethyl Corporation, 1,3,5-trimethyl-2,4,6-tris(3,5-t-butyl-4-hydroxybenzyl)benzene
HostVP = Hostanox ™ VP ZNCS1, a zinc carbamate, $Zn((C_9H_{19})_2NCS)_2$.
Ir1098 = Irganox ™ 1098 from Ciba Geigy, N,N'-hexamethylene-bis(3,5-di-t-butyl-4-hydroxyhydrocinnamamide
Ir 259 = Irganox ™ 259, hexamethylene-bis(3,5-di-t-butyl-4-hydroxyhydrocinnamate
Ir1010 = Irganox ™ 1010, tetrakis(methylene(3,5-di-t-butyl-4-hydroxyhydrocinnamate)methane
Ir1024 = Irganox ™ MD-1024, 1,2-bis(3,5-di-t-butyl-4-hydroxyhydrocinnamoyl)hydrazine
Ir1425 = Irganox ™ 1425, calcium bis(monoethyl(3,5-di-t-butyl-4-hydroxybenzyl)phosphonate
Sant R = Santonox ™ R from Monsanto, 4,4-thiobis(6-t-butylmetacresol)
BHT = butylated hydroxytoluene.

In these Examples, a 2.27 kg sample of resin was weighed into a polyethylene bag. The other indicated components were sprinkled into the bag in the amounts indicated. The mixture was dry blended by shaking and turning the inflated plastic bag. The resulting blend was then extruded using a Werner & Pfleiderer ™ ZSK-30 twin-screw extruder fitted with a strand die, and air-cooled quench belt, and a strand granulator. During extrusion, the melt was devolatilized at 37 kPa (11 inches Hg) vacuum. The cut pellets of compounded resin were packaged in polypropylene bottles to prevent moisture absorption.

The viscosity-time behavior of each sample at 250° C. was determined in a constant-rate piston type rheometer (from Kaye-Ness). The rheometer was charged with 10 g of resin; after a melting time of 3 minutes, the charge was slowly extruded for 34 minutes through a 0.5 mm (0.02 inch) diameter, 10 mm (0.4 inch) long orifice. The shear rate was about 188 sec$^{-1}$. Five values of viscosity were printed out at equal time increments of 6 minutes and the ratio of the value at 34 minutes to that at 10 minutes ($\eta_{34}/\eta_{10}$, or "viscosity ratio") was calculated. A value of 1.0 for this ratio would indicate no change in viscosity. The values of this ratio are reported in Table I for each of the examples.

The extent of oxidative gel formation for each example was quantitatively determined. A circular sample of film about 0.25 mm (10 mils) thick and 13 cm (5 inches) in diameter was placed in a controlled atmosphere chamber between the plates of a press. (The chamber consisted of a 140 mm diameter O-ring of Viton® fluoroelastomer (Du Pont), resting on a sheet of aluminum foil on the bottom face of the press; inlet and outlet ports were provided by piercing the O-ring with hypodermic needles.) The chamber was purged with nitrogen as the press was heated to 220° C. Air was then passed through the heated chamber to contact the upper surface of the molten resin for 20 minutes. At the end of the 20 minutes, the chamber was again purged with nitrogen while the press was cooled to ambient temperature. The amount of gel formed in the film sample was determined by dissolving the entire sample by heating in 50% aqueous isopropanol. The hot solution was filtered through a tared 200 mesh (74 micrometer) stainless steel screen 63.5 mm in diameter and, after drying, the weight of undissolved gel on the screen was determined. The amount of gel is reported in Table I in grams per square meter of exposed film surface area. For some of the more oxidation resistant compositions, a comparable 30 minute test was used.

The results in Table I show that unstabilized resin exhibits about 27.7 g/m$^2$ oxidative gel formation. Addition of traditional hindered phenolic antioxidants provides no significant improvement. Further addition of calcium stearate or a mixture of calcium stearate and calcium acetate provides only a minor improvement. However, compositions including a combination of phenolic antioxidant, calcium stearate, and the calcium salt of carboxylic acid having 3 to 9 carbon atoms show a significant reduction in oxidative gel formation, to values as low as 0.06 g/m$^2$ or better. This improvement is generally greater when the lower calcium carboxylate salt is present at about 3 micromoles/g; at lower levels, down to 2 micromoles/g, the improvement is less but still very significant. The best results are obtained using salts of $C_6$–$C_8$ acids; calcium dodecanoate appears to be at or beyond the upper limit in terms of acid carbon chain length, since at lower concentrations of this salt the reduction in gel formation is less pronounced. The results also show (Comparative Example C6) that when the phenolic antioxidant is removed from a calcium octanoate system the gel formation increases by a factor of almost 30. Thus in these examples it is the combination of a calcium alkanoate and a phenolic antioxidant that provides the resistance to oxidative gelation. The apparent synergism between certain metal salts of aliphatic acids of 3 to 9 carbon atoms chain length and phenolic antioxidants is an unexpected discovery.

The results also show that compositions of the present invention exhibit an improved viscosity ratio compared with unstabilized EVOH resin and in many cases compared with resin stabilized with phenolic antioxidant and calcium stearate. Several examples show viscosity ratios of less than 1.1 or even less than 1.0. Calcium heptanoate seems to be the most effective additive for this purpose, although salts of $C_3$–$C_9$ aliphatic acids show a useful effect.

The present invention thus provides the ability to formulate compositions having excellent resistance to oxidative gelation and almost any desired viscosity behavior as a function of time.

TABLE I[a]

| | Additive 1 | | | Additive 2 | | | Additive 3 | | Viscosity Ratio | Oxidative Gel, g/m$^2$ | |
|---|---|---|---|---|---|---|---|---|---|---|---|
| Ex. | Type | ppm | μmol/g | Type | ppm | μmol/g | Type | ppm | $\eta 34/\eta 10$ | 20, | 30 min |
| C1 | -- | 0 | 0 | -- | 0 | 0 | -- | 0 | 2.21 | 27.7 | -- |
| C2 | -- | 0 | 0 | -- | 0 | 0 | Etx 330 | 2500 | 1.38 | 23.6 | -- |
| C3 | CaSte | 2818 | 4.65 | -- | 0 | 0 | " | " | 1.22 | 4.6 | -- |
| C3 | " | 2212 | 3.65 | -- | 0 | 0 | " | " | 1.2 | 18.8 | -- |
| C4 | " | 1000 | 1.65 | CaAce | 528 | 3.0 | " | " | 1.34 | 20.0 | -- |
| C5 | " | " | " | " | 352 | 2.0 | " | " | 1.29 | 5.58 | -- |
| 6 | " | " | " | CaPro | 558 | 3.0 | " | " | 0.99 | 0.095 | 0.50 |
| 7 | " | " | " | " | 372 | 2.0 | " | " | 1.1 | 1.1 | -- |
| 8 | " | " | " | " | 186 | 1.0 | " | " | 1.27 | 1.13 | -- |
| 9 | " | " | " | CaBut | 804 | 3.0 | " | " | 0.98 | 0.118 | 0.23 |
| 10 | " | " | " | " | 536 | 2.0 | " | " | 1.08 | 0.33 | -- |
| 11 | " | " | " | " | 268 | 1.0 | " | " | 1.27 | 0.51 | -- |
| 12 | " | " | " | CaHex | 810 | 3.0 | " | " | 0.92 | 0.056 | 0.64 |
| 13 | " | " | " | " | 540 | 2.0 | " | " | 1.16 | 0.20 | 2.02 |
| 14 | " | " | " | " | 270 | 1.0 | " | " | 1.31 | 0.40 | -- |
| 15 | " | " | " | CaHep | 893 | 3.0 | " | " | (low) | 0.08 | 0.22 |
| 16 | " | " | " | " | 595 | 2.0 | " | " | 0.88 | 0.09 | 0.47 |
| 17 | " | " | " | " | 298 | 1.0 | " | " | 1.21 | 0.135 | -- |
| 18 | " | " | " | CaOct | 1305 | 4.0 | " | " | 1.02 | 0.21 | -- |
| 19 | " | " | " | " | " | " | " | " | 0.77 | 0.12 | 0.59 |
| 20 | " | " | " | " | 976 | 3.0 | " | " | 1.2 | 0.20 | 1.43 |
| 21 | " | " | " | " | 652 | 2.0 | " | " | 1.22 | 0.33 | 2.33 |
| 22 | " | " | " | " | 652 | 2.0 | " | " | 1.16 | 0.19 | -- |
| 23 | " | " | " | " | 326 | 1.0 | " | " | 1.20 | 0.6 | -- |

TABLE I-continued

| Ex. | Additive 1 | | | Additive 2 | | | Additive 3 | | Viscosity Ratio | Oxidative Gel, g/m² | |
|---|---|---|---|---|---|---|---|---|---|---|---|
| | Type | ppm | μmol/g | Type | ppm | μmol/g | Type | ppm | η34/η10 | 20, | 30 min |
| C24 | " | " | " | " | 978 | 3.0 | -- | 0 | 1.34 | 5.7 | -- |
| 25 | " | " | " | Ca2EH | 652 | 2.0 | Etx 330 | 2500 | 1.07 | 0.54 | -- |
| 26 | " | " | " | " | 326 | 1.0 | " | " | 1.30 | 1.15 | -- |
| 27 | " | " | " | CaNon | 1062 | 3.0 | " | " | 1.26 | 0.50 | 0.74 |
| 28 | " | " | " | " | 708 | 2.0 | " | " | 1.37 | 0.25 | -- |
| 29 | " | " | " | " | 354 | 1.0 | " | " | 1.34 | 1.7 | -- |
| C30 | " | " | " | CaDod | 1370 | 3.0 | " | " | 1.49 | 0.88 | -- |
| C31 | " | " | " | " | 913 | 2.0 | " | " | 1.37 | 9.8 | -- |

¹Hyphens (--) indicate component not present or measurement not made.

EXAMPLES 32–66

A series of experiments were performed under the conditions outlined above to explore the effect of changing the amount and identity of the phenolic antioxidant. The compositions and results are shown in Table II.

The results show that that a variety of hindered phenolic antioxidants perform comparably well in combination with a suitable type and concentration of calcium alkanoate. In one Example (60) Irganox ™ 1010 was less effective than some of the others. Concentrations of phenolic antioxidant as low as 1000 parts per million are seen to be effective. It is also seen from Examples 41, 43, and 46 that the presence of calcium stearate is not essential. Comparative Example C58 represents an experiment in which calcium acetate was moderately effective at preventing oxidative gel formation, although the viscosity ratio of this example was not significantly improved.

TABLE II

| Ex. | Additive 1 | | | Additive 2 | | | Additive 3 | | Viscosity Ratio | Oxidative Gel, g/m² | |
|---|---|---|---|---|---|---|---|---|---|---|---|
| | Type | ppm | μmol/g | Type | ppm | μmol/g | Type | ppm | η34/η10 | 20, | 30 min |
| 32 | CaSte | 1000 | 1.65 | CaPro | 558 | 3.0 | Etx 330 | 1000 | 0.61 | 0.22 | -- |
| 33 | " | " | " | CaBut | 804 | 3.0 | " | " | 0.58 | 0.20 | -- |
| 34 | " | " | " | CaHex | 810 | 3.0 | " | " | 0.86 | 0.23 | -- |
| 35 | " | " | " | CaOct | 978 | 3.0 | " | " | 1.01 | 0.14 | -- |
| 36 | " | " | " | CaOct | 652 | 2.0 | " | 1250 | 1.23 | 0.25 | -- |
| 37 | " | " | " | CaPro | 372 | 2.0 | " | " | 1.08 | 0.63 | -- |
| 38 | " | " | " | CaPro | 558 | 3.0 | " | 1500 | 0.89 | 0.82 | -- |
| C39 | -- | 0 | 0 | -- | 0 | 0 | Sant R | 2000 | 1.24 | 27.1 | -- |
| 40 | CaSte | 1000 | 1.65 | CaOct | 652 | 2.0 | " | " | 0.99 | 0.22 | -- |
| 41 | -- | 0 | 0 | CaOct | 978 | 3.0 | " | " | 0.77 | 0.19 | -- |
| 42 | CaSte | 1000 | 1.65 | CaHex | 540 | 2.0 | " | " | 1.11 | 0.16 | -- |
| 43 | -- | 0 | 0 | " | 810 | 3.0 | " | " | 0.79 | 0.29 | -- |
| 44 | Aclyn | 1000 | -- | " | " | " | " | " | 0.93 | 0.14 | -- |
| 45 | CaSte | 1000 | 1.65 | CaPro | 372 | 2.0 | " | " | 0.97 | 0.11 | -- |
| 46 | -- | 0 | 0 | " | 558 | 3.0 | " | " | 1.10 | 0.28 | -- |
| 47 | Aclyn | 2000 | -- | " | " | " | " | " | 0.86 | 0.095 | -- |
| 48 | CaSte | 1000 | 1.65 | CaOct | 652 | 2.0 | " | " | 0.68 | 0.079 | -- |
| | | | | CaPro | 186 | 1.0 | | | | | |
| 49 | " | 606 | 1.0 | CaDod | 407 | 1.0 | " | " | 0.38 | 0.095 | 0.39 |
| | | | | CaOct | 652 | 2.0 | | | | | |
| | | | | CaPro | 186 | 1.0 | | | | | |
| C50 | -- | 0 | 0 | -- | 0 | 0 | Ir 1098 | 2000 | 1.29 | 13.5 | -- |
| 51 | CaSte | 1000 | 1.65 | CaOct | 978 | 3.0 | " | 1000 | -- | 0.76 | 0.81 |
| 52 | " | " | " | " | " | " | " | 1500 | -- | 1.12 | -- |
| 53 | " | " | " | " | " | " | " | 2000 | 1.24 | 0.15 | 0.50 |
| 54 | " | " | " | " | " | " | " | " | 0.71 | 0.071 | -- |
| 55 | " | " | " | " | 652 | 2.0 | " | " | 0.93 | 0.31 | 0.56 |
| 56 | " | " | " | CaPro | 372 | 2.0 | " | " | 1.21 | 0.14 | -- |
| 57 | " | " | " | CaPro | 558 | 3.0 | " | 1000 | 0.94 | 0.34 | -- |
| C58 | " | " | " | CaAce | 528 | 3.0 | " | 2000 | 1.36 | 0.33 | -- |
| 59 | " | " | " | CaOct | 978 | 3.0 | Ir 259 | 2500 | -- | 0.015ª | -- |
| 60 | " | " | " | " | " | " | Ir 1010 | 2500 | -- | 0.84 | -- |
| 61 | " | " | " | CaHep | 595 | 2.0 | Ir 1024 | 2000 | 0.40 | 0.10 | 0.33 |
| 62 | " | " | " | " | " | " | Ir 1425 | 2000 | 1.25 | 0.22 | 1.02 |
| 63 | " | " | " | CaOct | 978 | 3.0 | Sant R | 2500 | 1.15 | 0.095 | 1.47 |
| 64 | " | " | " | " | " | " | Ir 1098 | 2000 | 1.24 | 0.20 | -- |
| 65 | " | " | " | " | " | " | BHT | 1000 | 0.97 | 0.33 | -- |
| 66 | " | " | " | CaOct | 652 | 2.0 | Ir 259 | 2000 | -- | 0.12 | -- |
| | | | | CaPro | 372 | 2.0 | | | | | |

ªEarlier measurement was 5.25, believed due to experimental error.

EXAMPLES 67–102

Several experiments were conducted to determine the effect of using comparable salts of other metals in place of calcium. These compositions used in these experiments are set forth in Table III.

The results show that zinc, magnesium, tin, manganese, lead, potassium and sodium compounds are also effective in the present invention. For some metals the use of the stearate alone provides some antioxidant protection, but this is generally increased when a salt of a lower alkanoate is also present. It is notable that zinc and magnesium acetates are much less effective than the higher alkanoates. Tin and lead exhibit signifcant synergism with a phenolic antioxidnate, but also produce such extreme reductions of melt viscosity as to be less desirable for many applications. Magnesium shows some tendency toward excessive viscosity loss, but less severely. In contrast, the monovalent cations (Na and K) show relatively little ability to control viscosity.

Manganese butyrate and octoate (2-ethylhexanoate) provide excellent protection against oxidative gel, even without an antioxidant present, but at the low levels required have little effect on viscosity.

Aluminum stearate or oleate or Hostanox TM VP confer no benefits.

ates. Use of magnesium hydroxide in place of a lower alkanoate results in an undesirably severe reduction of viscosity and fails to prevent unacceptable gel formation at the longer exposure time (30 minutes). When the amount of magnesium hydroxide is reduced in order to gain better viscosity control (C107 and C108), the amount of oxidative gel formation increases to an unacceptable level, so that a good balance of viscosity control and oxidative gel reduction was not obtainable. Thus while magnesium hydroxide might be useful for simple digestion of EVOH in a blend or regrind situation, it is not a useful reagent for stabilizing neat EVOH resins. The other materials exemplified also generally

TABLE III

| | Additive 1 | | | Additive 2 | | | Additive 3 | | Viscosity Ratio | Oxidative Gel, g/m$^2$ | |
|---|---|---|---|---|---|---|---|---|---|---|---|
| Ex. | Type | ppm | μmol/g | Type | ppm | μmol/g | Type | ppm | η34/η10 | 20, | 30 min |
| C67 | ZnSte | 2943 | 4.65 | -- | 0 | 0 | Etx 330 | 2500 | 1.41 | 0.76 | -- |
| C68 | " | 1044 | 1.65 | -- | 0 | 0 | HostVP | 2000 | -- | 30. | -- |
| 69 | " | " | " | ZnOct | 1056 | 3.0 | Etx 330 | 2500 | 1.3 | 0.46 | 10.2 |
| 70 | " | " | " | ZnPen | 912 | 3.0 | " | " | 1.66 | 0.22 | -- |
| C71 | " | " | " | ZnAce | 658 | 3.0 | " | " | 1.46 | 6.36 | -- |
| C72 | " | 1000 | 1.58 | CaSte | 1000 | 1.65 | " | " | 1.27 | 0.48 | -- |
| C73 | MgSte | 2751 | 4.65 | -- | 0 | 0 | " | " | 1.06 | 0.46 | -- |
| C74 | " | 2160 | 3.65 | -- | 0 | 0 | " | " | 0.9 | 0.31 | 1.02 |
| C75 | " | 1568 | 2.65 | -- | 0 | 0 | " | " | 0.81 | 0.19 | -- |
| 76 | " | 976 | 1.65 | MgBut | 396 | 2.0 | " | " | 0.09$^a$ | 0.16 | -- |
| 77 | " | " | " | " | 198 | 1.0 | " | " | 0.20$^b$ | 0.12 | -- |
| C78 | " | " | " | MgAce | 428 | 2.0 | " | " | 0.09$^a$ | 4.34 | -- |
| 79 | " | " | " | CaOct | 652 | 2.0 | " | " | 0.24$^b$ | 0.087 | -- |
| 80 | " | " | " | " | 326 | 1.0 | " | " | 0.36 | 0.54 | -- |
| 81 | " | " | " | " | " | " | " | " | 0.32 | 0.22 | -- |
| C82 | " | 2160 | 3.65 | -- | 0 | 0 | BHT | 2000 | 0.66 | 0.095 | 0.85 |
| C83 | SnSte | 1815 | 2.65 | -- | 0 | 0 | Etx 330 | 2500 | 1.25 | 30.8 | -- |
| C84 | SnOle | 1802 | 2.65 | -- | 0 | 0 | " | " | 0.07$^a$ | 41.4 | -- |
| C85 | SnSte | 1000 | 1.65 | -- | 0 | 0 | " | " | 0.06$^a$ | 2.94 | -- |
| | SnOle | 901 | 1.33 | | | | | | | | |
| 86 | CaSte | 1000 | 1.65 | SnOct | 1000 | 2.47 | " | " | 0.1$^a$ | 0.46 | -- |
| 87 | " | " | " | " | 202 | 0.5 | " | " | 0.15$^a$ | 0.25 | -- |
| C88 | MnSte | 2892 | 4.65 | -- | 0 | 0 | " | " | 1.02 | 0.11 | 0.39 |
| C89 | " | 1648 | 2.65 | -- | 0 | 0 | " | " | 0.59 | 8.8 | -- |
| C90 | CaSte | 1000 | 1.65 | MnBut | 114 | 0.5 | " | 2000 | 1.19 | 0.07 | -- |
| C91 | " | " | " | " | " | " | -- | 0 | 1.17 | 0.09 | -- |
| C92 | " | " | " | MnOct | 171 | " | -- | 0 | 1.30 | 0.09 | -- |
| C94 | " | " | " | PbSte | 772 | 1.0 | Etx 330 | 2500 | 0.09$^a$ | 3.26 | -- |
| C95 | " | " | " | " | 386 | 0.5 | " | " | 0.18$^a$ | 1.55 | -- |
| C96 | NaSte | 2000 | 6.54 | -- | 0 | 0 | " | " | 1.28 | 0.39 | -- |
| 97 | " | 1010 | 3.3 | NaHep | 996 | 6.0 | " | " | 1.09 | 0.166 | 3.41 |
| 98 | KPal | 970 | 3.3 | K2EH | 1093 | 6.0 | " | " | 1.29 | 0.28 | 10.5 |
| 99 | KSte | 1062 | 3.3 | KiVal | 840 | 6.0 | " | " | 1.15 | 0.84 | -- |
| C100 | AlSt1 | 1600 | 4.65 | -- | 0 | 0 | " | " | 1.36 | 26.7 | -- |
| C101 | AlSt2 | 1600 | 2.71 | -- | 0 | 0 | " | " | 1.25 | 21.5 | -- |
| C102 | AlOl3 | 1600 | 1.84 | -- | 0 | 0 | " | " | 1.42 | 28.1 | -- |

$^a$low viscosity observed at 10 min. in Kaye-Ness rheometer.
$^b$low viscosity observed at 16 min. in Kaye-Ness rheometer.

COMPARATIVE EXAMPLES 103-119

These Comparative Examples, shown in Table IV, illustrate the use of salts other than lower alkyl alkanogave unsatisfactory results. MnCO$_3$ imparted a tan color to the compound and did not provide control of viscosity increase.

TABLE IV

| | Additive 1 | | | Additive 2 | | | Additive 3 | | Viscosity Ratio | Oxidative Gel, g/m$^2$ | |
|---|---|---|---|---|---|---|---|---|---|---|---|
| Ex. | Type | ppm | μmol/g | Type | ppm | μmol/g | Type | ppm | η34/η10 | 20, | 30 min |
| C103 | CaSte | 700 | 1.16 | Mg(OH)$_2$ | 500 | 8.58 | BHT | 2000 | 0.12$^b$ | 0.126 | -- |
| C104 | " | " | " | " | " | " | Ir 1098 | 2000 | 0.06$^a$ | 0.126 | -- |
| C105 | " | 1000 | 1.65 | " | 234 | 4.0 | Etx 330 | 2500 | 0.16$^b$ | 0.23 | -- |
| C106 | " | " | " | " | 117 | 2.0 | " | " | 0.24 | 0.40 | 10.5 |
| C107 | " | " | " | " | 75 | 1.28 | " | " | 0.56 | 17.7 | -- |
| C108 | " | " | " | " | 50 | 0.85 | " | " | 0.81 | 17.5 | -- |
| C109 | MgSte | 400 | 0.68 | " | 100 | 1.71 | " | " | 0.90 | 14.1 | -- |
| C110 | CaSte | 1000 | 1.65 | MnCO$_3$ | 345 | 3.0 | " | " | 1.34 | 0.12$^c$ | 0.16 |
| C111 | " | " | " | " | 115 | 1.0 | " | " | 1.02 | 0.16$^c$ | 0.17 |
| C112 | " | " | " | MnGlu | 2769 | 3.0 | " | " | 1.10 | 0.16$^d$ | -- |
| C113 | " | " | " | MnCit | 1630 | 3.0 | " | " | 1.17 | 11.5 | -- |
| C114 | " | " | " | MnGlp | 113 | 0.5 | -- | 0 | 1.42 | 0.25 | -- |

TABLE IV-continued

| Ex. | Additive 1 | | | Additive 2 | | | Additive 3 | | Viscosity Ratio | Oxidative Gel, g/m² | |
|---|---|---|---|---|---|---|---|---|---|---|---|
| | Type | ppm | μmol/g | Type | ppm | μmol/g | Type | ppm | η34/η10 | 20, | 30 min |
| C115 | " | " | " | CaCO₃ | 300 | 3.0 | Etx 330 | 2500 | 1.32 | 4.80 | -- |
| C116 | " | " | " | CaBen | 1007 | 3.0 | " | " | 1.07 | 18.4 | -- |
| C117 | " | " | " | CaAsc | 1277 | 3.0 | " | " | 1.24 | 5.1 | -- |
| C118 | " | " | " | MgCar | 591 | 6.0 | " | " | 0.76 | 0.91 | -- |
| C119 | " | " | " | CaOct | 652 | 2.0 | " | " | 1.13 | 0.102 | -- |
| | | | | Al₂O₃ | 75 | 1.47 | | | | | |

*a* Low viscosity observed at 10 min. in Kaye-Ness rheometer.
*b* Low viscosity observed at 16 min. in Kaye-Ness rheometer.
*c* Tan color.
*d* Film developed brown specks, presumably from carmelization of gluconate moiety.

EXAMPLES 120–125

Examples similar to those reported above were conducted using a different ethylene vinyl alcohol copolymer. The polymer used in these examples was prepared by sodium hydroxide saponification of the corresponding ethylene vinyl acetate copolymer. The polymer had a yellowish color, indicating that some unsaturation had been introduced by the relatively harsh saponification reaction conditions. This polymer had an ethylene content of 30.3 mol %, a melt flow index of 6.7 dg/min, a melting point of 184° C. It contained 1.04% unhydrolyzed vinyl acetate moieties and 24 ppm residual sodium. This resin exhibited poor thermal stability: viscosity nearly doubled over a 24 minute test period in a Kaye-Ness TM rheometer. The results in Table V are in accord with the results from the earlier examples of Table I, although the improvement was not as marked at the concentrations examined. Use of the antioxidant "Irganox" 1098 alone was ineffectual, whereas the combination of a calcium alkanoate with any of three different antioxidants gave substantial protection against oxidation.

EXAMPLES 126–131

Similar tests were performed using a third ethylene vinyl alcohol polymer prepared by the same sodium hydroxide saponification process. The polymer had a pronounced yellow color. The polymer had an ethylene content of 42 mol %, a melt flow index of 14.5 dg/min, and a melting point of 160° C. It contained 0.83 percent unhydrolyzed vinyl acetate moieties and 13 ppm residual sodium. The results in Table VI are in accord with the results from the earlier examples, although the improvement in oxidation resistance was not as marked at the concentrations examined.

TABLE V

| Ex. | Additive 1 | | | Additive 2 | | | Additive 3 | | Viscosity Ratio | Oxidative Gel, g/m² |
|---|---|---|---|---|---|---|---|---|---|---|
| | Type | ppm | μmol/g | Type | ppm | μmol/g | Type | ppm | η34/η10 | 20 min |
| C120 | -- | 0 | 0 | -- | 0 | 0 | -- | 0 | 1.84 | 20.3 |
| C121 | -- | 0 | 0 | -- | 0 | 0 | Ir 1098 | 2000 | 1.74 | 19.7 |
| 122 | CaSte | 1000 | 1.65 | CaHep | 1190 | 4.0 | " | " | 0.21 | 3.6 |
| 123 | -- | 0 | 0 | CaOct | 1842 | 5.65 | " | " | 0.42 | 9.5 |
| 124 | -- | 0 | 0 | " | 2500 | 7.67 | Ir 1019 | 2500 | 0.28 | 2.3 |
| 125 | -- | 0 | 0 | " | " | " | Etx 330 | 2500 | 0.23 | 0.71 |

TABLE VI

| Ex. | Additive 1 | | | Additive 2 | | | Additive 3 | | Viscosity Ratio | Oxidative Gel, g/m² |
|---|---|---|---|---|---|---|---|---|---|---|
| | Type | ppm | μmol/g | Type | ppm | μmol/g | Type | ppm | η34/η10 | 20 min |
| C126 | -- | 0 | 0 | -- | 0 | 0 | -- | 0 | 1.45 | 32.1 |
| C127 | -- | 0 | 0 | -- | 0 | 0 | Ir 1019 | 2000 | 1.37 | 31.3 |
| C128 | -- | 0 | 0 | -- | 0 | 0 | Etx 330 | 2000 | 1.38 | 34.4 |
| C129 | CaSte | 3424 | 5.65 | -- | 0 | 0 | Ir 1019 | 2000 | 1.22 | 25.0 |
| 130 | -- | 0 | 0 | CaOct | 2000 | 6.14 | " | " | 0.67 | 12.4 |
| 131 | -- | 0 | 0 | CaHep | 1190 | 4.0 | Etx 330 | 2000 | 0.80 | 8.1 |

EXAMPLES 132–165

Similar tests were performed using an ethylene vinyl alcohol polymer prepared by the same sodium hydroxide saponification process. This polymer also had a yellow color. The polymer had an ethylene content of 31.3 mol %, a melt flow index of 1.2 dg/min, and a melting point of 187° C. It contained 0.99 percent unhydrolyzed vinyl acetate moieties and 19 ppm residual sodium. Table VII shows the results of tests on blends using this polymer. The results are qualitatively similar to those shown in Table I. In this table the viscosity ratio is presented as $L_{30}/L_{15}$, the ratio of torque measured at 30 and 15 minutes residence time in a Haake TM system 40 or 90 torque rheometer.

TABLE VII

| Ex. | Additive 1 | | | Additive 2 | | | Additive 3 | | Viscosity Ratio | Oxidative Gel, g/m² |
|---|---|---|---|---|---|---|---|---|---|---|
| | Type | ppm | μmol/g | Type | ppm | μmol/g | Type | ppm | L30/L15 | 20 min |
| C132 | -- | 0 | 0 | -- | 0 | 0 | -- | 0 | 1.37 | 30.4 |

TABLE VII-continued

| Ex. | Additive 1 Type | ppm | μmol/g | Additive 2 Type | ppm | μmol/g | Additive 3 Type | ppm | Viscosity Ratio L30/L15 | Oxidative Gel, g/m² 20 min |
|---|---|---|---|---|---|---|---|---|---|---|
| C133 | -- | 0 | 0 | -- | 0 | 0 | Ir 1098 | 2000 | 1.45 | 25.1 |
| C134 | -- | 0 | 0 | -- | 0 | 0 | Ir 1019 | 2000 | 1.62 | 23.1 |
| C135 | -- | 0 | 0 | -- | 0 | 0 | Etx 330 | 2000 | 1.50 | 27.7 |
| C136 | CaSte | 3424 | 5.65 | -- | 0 | 0 | -- | 0 | 1.52 | 27.0 |
| C137 | " | " | " | -- | 0 | 0 | Ir 1098 | 2000 | 1.61 | 21.4 |
| C138 | " | " | " | -- | 0 | 0 | " | " | 1.33 | 37.5 |
| C139 | " | 1000 | 1.65 | CaAce | 704 | 4.0 | " | " | -- | 21.2 |
| 140 | " | " | " | CaPro | 372 | 2.0 | " | " | 0.81 | 5.7 |
| 141 | " | " | " | " | 558 | 3.0 | " | " | 1.15 | 5.4 |
| 142 | " | " | " | CaBut | 536 | 2.0 | " | " | 0.85 | 11.6 |
| 143 | " | " | " | " | 804 | 3.0 | " | " | 0.63 | 1.46 |
| 144 | " | " | " | " | " | " | " | " | 0.76 | 5.9 |
| 145 | " | " | " | " | 1072 | 4.0 | Ir 1010 | 2000 | 0.27 | 9.5 |
| 146 | " | " | " | CaHep | 595 | 2.0 | Ir 1098 | 2000 | 0.9 | 2.0 |
| 147 | " | " | " | " | 744 | 2.5 | " | " | 0.42 | 4.0 |
| 148 | " | " | " | " | 893 | 3.0 | " | " | 0.36 | 3.4 |
| 149 | " | " | " | " | 1190 | 4.0 | " | " | 0.39 | 0.48 |
| 150 | " | " | " | CaOct | 978 | 3.0 | " | 1000 | -- | 19-20 |
| 151 | " | " | " | " | " | " | " | 1500 | -- | 10-14 |
| 152 | " | " | " | " | " | " | " | 2500 | 1.01 | 1.5 |
| 153 | " | " | " | " | 1174 | 3.6 | Ir 1019 | 2500 | 1.18-1.12 | 1.1 |
| 154 | " | " | " | " | 1304 | 4.0 | Ir 1098 | 2000 | 0.9 | 0.59 |
| 155 | " | " | " | " | " | " | Etx 330 | 2500 | 0.34 | 0.98 |
| 156 | " | " | " | " | " | " | Sant R | 2500 | 0.65 | 0.67 |
| 157 | " | " | " | " | 1763 | 5.41 | Ir 1098 | 2000 | 0.65 | 1.50 |
| 158[a] | " | " | " | " | " | " | " | " | 0.33 | 0.71 |
| 159 | " | " | " | " | " | " | Ir 1098 | 1000 | 0.43 | 0.45 |
|  |  |  |  |  |  |  | Ir 1019 | 1000 |  |  |
| 160 | " | " | " | " | " | " | Ir 1019 | 2000 | 0.49 | 0.53 |
| 161 | " | " | " | " | " | " | Ir 1076 | 2000 | 0.72 | 2.5 |
| 162 | " | " | " | " | " | " | Ir 1010 | 2000 | 0.69 | 7.1 |
| 163 | " | " | " | CaNon | 1416 | 4.0 | Ir 1098 | 2000 | 0.95 | 6.4 |
| 164 | CaSte | 606 | 1.0 | CaOct | 752 | 2.3 | " | " | 1.05 | 3.7 |
|  | MgSte | 592 | 1.0 |  |  |  |  |  |  |  |
| 165 | same | same | same | " | 978 | 3.0 | " | " | 1.18 | 1.1 |

[a]Includes 3000 ppm Aclyn ™ 295A, a low molecular weight ionomer of ethylene-acrylic acid copolymer, from Allied-Signal

EXAMPLES 166-181

Tests were performed using the same polymer as in the previous examples using a variety of calcium alkanoates and antioxidants. In this series no stearate was used in addition to the other alkanoate. The results are shown in Table VIII.

TABLE VIII

| Ex. | Additive 1 Type | ppm | μmol/g | Additive 2 Type | ppm | Viscosity Ratio L30/L15 | Oxidative Gel, g/m² 20 min |
|---|---|---|---|---|---|---|---|
| C166 | -- | 0 | 0 | -- | 0 | 1.52 | 24.6 |
| C167 | -- | 0 | 0 | -- | 0 | 1.51 | 22.5 |
| C168 | -- | 0 | 0 | -- | 0 | 1.55 | 27.1 |
| C169 | CaAce | 704 | 4.0 | Ir 1098 | 2000 | 1.19 | 14.7 |
| 170 | CaHep | 1100 | 3.7 | " | " | 0.42 | 1.4 |
| 171 | CaOct | 1842 | 5.65 | " | " | 0.55 | 0.54 |
| 172 | " | 2500 | 7.67 | " | 2500 | low[a] | 0.90 |
| 173 | " | 1000 | 3.07 | " | 1000 | 0.97 | 10.5 |
| 174 | " | 2000 | 6.14 | Ir 1019 | 2500 | 0.29 | 1.26 |
| 175 | " | 1842 | 5.65 | " | 2000 | 0.27 | 2.0 |
| 176 | " | " | " | Sant R | 2000 | 0.39 | 4.7 |
| 177 | " | " | " | Ir 259 | 2000 | 0.34 | 5.4 |
| 178 | CaNon | 2000 | 5.65 | Ir 1098 | 2000 | 0.38 | 6.5 |
| C179 | CaDod | 2580 | 5.65 | " | " | 0.81 | 2.22 |
| C180 | " | 3016 | 6.6 | " | " | 1.01 | 4.0 |
| C181 | CaSte | 3424 | 5.65 | " | " | 1.61 | 21.4 |

[a]excessive reduction in viscosity in this sample.

The results in this table show that neither calcium acetate nor calcium stearate alone exhibit useful synergy with the antioxidant. Calcium nonanoate or calcium dodecanoate plus antioxidant showed reduction in gel, with the best performances being given by calcium heptanoate and octanoate. The combination of 3.07 micromoles/g calcium octanoate with 1000 ppm antioxidant was apparently insufficient to adequately prevent oxidation (cf. Examples 150 and 151). Calcium dodecanoate, acetate, and stearate showed the least effectiveness in controlling viscosity rise.

EXAMPLES 182-189

Several experiments were run using the same EVOH and salts of a variety of metals other than calcium. The results in Table IX show that magnesium stearate at fairly high loading is effective (168), whereas magnesium acetate behaves somewhat like magnesium hydroxide, i.e., at the concentrations needed to provide synergy with the antioxidant, the viscosity reduction is excessive (C183 and C184). The salts of zinc are somewhat less effective for this resin, but still show activity.

EXAMPLES 190-205

A different sample of ethylene vinyl alcohol copolymer was examined, which had been prepared by base-catalyzed methanolysis of ethylene vinyl acetate copolymer. This material was white in color. The polymer had an ethylene content of 45 mol %, a melt flow index of 12 dg/min, and a melting point of 165° C. It contained less than 1 percent unhydrolyzed vinyl acetate moieties and 38 ppm residual sodium.

The results in Table X show that calcium salts of lower alkanoates (3, 4, 6, 8, and 9 carbon atoms) are effective in combination with a hindered phenolic antioxidant for reducing oxidative gel formation while simultaneously controlling viscosity. Examples 199-202 and 204 clearly illustrate the well-defined minimum in oxidative gel formation at about $C_6$ chain length, confirming the results of the first resin examined in Table I.

In contrast, a zinc carbamate stabilizer ("Hostanox" VP ZNCS1, abbreviated as "HosVP") proved detrimental to EVOH stability.

TABLE IX

| Ex. | Additive 1 | | | Additive 2 | | | Additive 3 | | Viscosity Ratio | Oxidative Gel, g/m² |
|---|---|---|---|---|---|---|---|---|---|---|
| | Type | ppm | μmol/g | Type | ppm | μmol/g | Type | ppm | L30/L15 | 20 min |
| 182 | MgSte | 3343 | 5.65 | -- | 0 | 0 | Ir 1098 | 2000 | 0.81 | 3.9 |
| C183 | " | 976 | 1.65 | MgAce | 428 | 2.0 | " | " | 0.3 | 6.8 |
| C184 | " | " | 1.65 | " | 856 | 4.0 | " | " | 0.28 | 0.06-0.16 |
| 185 | -- | 0 | 0 | ZnOct | 1989 | 5.65 | " | " | 0.38 | 13.6 |
| 186 | ZnSte | 1038 | 1.65 | " | 1056 | 3.0 | " | " | -- | 14.6 |
| 187 | " | " | " | " | 1408 | 4.0 | Etx 330 | 2000 | 0.92 | 11.3 |
| 188 | " | " | " | ZnPen | 1216 | 4.0 | Ir 1098 | 2000 | 1.09 | 4.8 |
| 189 | " | " | " | CaOct | 1304 | 4.0 | " | " | 0.81 | 3.9 |

TABLE X

| Ex. | Additive 1 | | | Additive 2 | | | Additive 3 | | Viscosity Ratio | Oxidative Gel, g/m² |
|---|---|---|---|---|---|---|---|---|---|---|
| | Type | ppm | μmol/g | Type | ppm | μmol/g | Type | ppm | η34/η10 | 20 min |
| 190 | -- | 0 | 0 | -- | 0 | 0 | -- | 0 | 1.14 | 38.4 |
| C191 | CaSte | 2818 | 4.65 | -- | 0 | 0 | Eth 330 | 2500 | 1.44 | 3.1 |
| 192 | " | 1000 | 1.65 | CaPro | 558 | 3.0 | " | " | 1.09 | 0.76 |
| 193 | " | " | " | " | 744 | 4.0 | " | " | 0.29 | 0.62 |
| 194 | " | " | " | CaOct | 976 | 3.0 | " | " | 1.21 | 0.34 |
| 195 | -- | 0 | 0 | " | 1627 | 5.0 | " | " | 0.40 | 0.31 |
| C196 | -- | 0 | 0 | HosVP | 2000 | 2.65 | -- | 0 | -- | 40.3 |
| C197 | CaHep | 595 | 2.0 | " | " | " | -- | 0 | -- | 32.6 |
| C198 | -- | 0 | 0 | " | " | " | Eth 330 | 2500 | -- | 47.3 |
| 199 | CaSte | 1000 | 1.65 | CaPro | 774 | 4.0 | Sant R | 2000 | 0.13 | 0.26 |
| 200 | " | " | " | CaBut | 1072 | " | " | " | 0.34 | 0.15 |
| 201 | " | " | " | CaHex | 1080 | " | " | " | 0.32 | 0.09 |
| 202 | " | " | " | CaOct | 1304 | " | " | " | 0.38 | 0.17 |
| 203 | " | " | " | CaOct | 976 | 3.0 | " | " | 0.29ᵃ | 0.13 |
| | | | | MgCar | 295 | 3.0 | " | " | | |
| 204 | " | " | " | CaNon | 1416 | 4.0 | " | " | 0.50 | 0.47 |
| 205 | MgSte | 976 | 1.65 | CaOct | 976 | 3.0 | " | " | 0.05ᵃ | 0.07 |

ᵃLow viscosity at 10 minutes in Kaye-Ness rheometer.

I claim:

1. A composition exhibiting improved stability toward oxidative gel formation at elevated temperatures, consisting essentially of:
   (a) at least one copolymer of ethylene and about 90 to about 50 percent by weight of vinyl alcohol moieties, having a degree of saponification of at least about 90%;
   (b) about 0.01 to about 0.5 weight percent of at least one monovalent or divalent metal salt of an aliphatic carboxylic acid having 3 to 9 carbon atoms; and
   (c) about 0.05 to about 0.5 weight percent of at least one hindered phenolic antioxidant.

2. A composition according to claim 1 which is substantially free from acetic acid or salts of acetic acid.

3. The composition of claim 1 wherein the salt is a divalent metal salt.

4. The composition of claim 3 further comprising:
   (d) about 0.05 to about 0.5 weight percent of a divalent metal salt of an alkylcarboxylic acid having about 14 to about 22 carbon atoms.

5. The composition of claim 4 wherein the alkylcarboxylic acid of (d) is stearic acid.

6. The composition of claim 1 wherein the copolymer of (a) comprises about 60 to about 80 weight percent vinyl alcohol moieties and is at least about 98 percent saponified.

7. The composition of claim 1 wherein the divalent metal salt of (b) is present in an amount of about 0.5 to about 15 micromoles per gram.

8. The composition of claim 1 wherein the divalent metal salt of (b) is present in an amount of about 1 to about 7 micromoles per gram.

9. The composition of claim 1 wherein the divalent metal salt of (b) is present in an amount of about 2 to about 4 micromoles per gram.

10. The composition of claim 3 wherein the aliphatic carboxylic acid has 3 to 8 carbon atoms.

11. The composition of claim 3 wherein the aliphatic carboxylic acid has 4 to 8 carbon atoms.

12. The composition of claim 3 wherein the divalent metal is selected from the group consisting of calcium, zinc, magnesium, manganese, tin, and mixtures of these metals.

13. The composition of claim 12 wherein the divalent metal is calcium.

14. The composition of claim 12 wherein the divalent metal is zinc.

15. The composition of claim 12 wherein the divalent metal is magnesium.

16. The composition of claim 3 wherein the hindered phenolic antioxidant is selected from the group consisting of 4,4'-thio-bis(6-t-butyl-m-cresol), 1,3,5-trimethyl-2,4,6-tris(3,5-t-butyl-4-hydroxybenzyl)benzene tetrakis(methylene(3,5-di-t-butyl-4-hydroxyhydrocinnamate)methane, octadecyl-3,5-di-t-butyl-4-hydroxyhydrocinnamate, N,N'-hexamethylene-bis(3,5-di-t-butyl-4-hydroxyhydrocinnamamide), N,N'-trimethylene-bis(3,5-di-t-butyl-4-hydroxyhydrocinnamamide), calcium bis(monoethyl(3,5-di-t-butyl-4-hydroxybenzyl)phosphonate), 1,2-bis(3,5-di-t-butyl-4-hydroxyhydrocinnamoyl)hydrazine and hexamethylenebis(3,5-di-t-butyl-4-hydroxyhydrocinnamate).

17. A composition according to claim 1 which exhibits oxidative gel formation of less than about 3 g/m$^2$ after contact with air for 20 minutes at 220° C. and a ratio of melt viscosity after 34 minutes at 250° C. to that after 10 minutes of about 0.3 to about 1.4.

18. The composition of claim 17 which exhibits said oxidative gel formation of less than about 0.7 g/m$^2$ and said ratio of melt viscosities of about 0.6 to about 1.1.

19. A process for improving the stability of an ethylene-vinyl alcohol resin towards oxidative gel formation, comprising the steps of:
 (a) providing at least one copolymer of ethylene and about 90 to about 50 weight percent copolymerized vinyl alcohol moieties, saponified to at least about 95%; and
 (b) melt compounding said copolymer with:
  (i) about 0.01 to about 0.5 weight percent of at least one monovalent or divalent metal salt of an aliphatic carboxylic acid having 3 to 9 carbon atoms; and
  (ii) about 0.05 to about 0.5 weight percent of at least one hindered phenolic antioxidant.

* * * * *